United States Patent
Montoya (10) Patent No.: US 9,506,828 B2
(45) Date of Patent: Nov. 29, 2016

(54) PASSIVE PRESSURE SENSING (71) Applicant: James Daniel Montoya, Santa Fe, NM (US)

(72) Inventor: James Daniel Montoya, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 240 days.

(21) Appl. No.: 14/320,194

(22) Filed: Jun. 30, 2014

(65) Prior Publication Data

US 2015/0377728 A1 Dec. 31, 2015

(51) Int. Cl.
*G01L 11/00* (2006.01)
*G01L 9/00* (2006.01)
*G01L 19/06* (2006.01)

(52) U.S. Cl.
CPC ............ *G01L 9/008* (2013.01); *G01L 9/0022* (2013.01); *G01L 19/0681* (2013.01)

(58) Field of Classification Search
CPC ..... G01L 9/008; G01L 9/04; G01L 19/0618; G01L 23/222; G01L 23/223; G01L 9/0022; G01L 9/007; G01L 23/12; G01L 9/10; G01H 11/02; Y10T 29/4902; Y10T 29/49877
USPC ............... 73/723, 703–704, 715, 654, 35.09, 73/35.11, 728
See application file for complete search history.

(56) References Cited

U.S. PATENT DOCUMENTS 4,409,816 A 10/1983 Yamaguchi
4,680,970 A 7/1987 Ueda
7,398,690 B1* 7/2008 Erickson ................ G01L 23/10 73/702
2002/0062696 A1* 5/2002 Burczyk ............... G01L 19/003 73/715
2012/0096945 A1* 4/2012 Sato ........................ G01L 9/008 73/723

FOREIGN PATENT DOCUMENTS

GB 2209219 5/1989
JP S61194325 8/1986

OTHER PUBLICATIONS

International Search Report for PCT/US2014/063219, mailed Feb. 2, 2015.

* cited by examiner

*Primary Examiner* — Lisa Caputo
*Assistant Examiner* — Brandi Hopkins
(74) *Attorney, Agent, or Firm* — King & Spalding LLP (57) ABSTRACT

A pressure sensor for sensing pressure of a fluid includes a diaphragm separator and a flexure structure. The diaphragm separator exerts an imparted force on the flexure structure, where the imparted force is proportional to fluid pressure exerted on the flexure structure. The pressure sensor further includes a piezoelectric resonator. A first resonator interface section of the flexure structure is in contact with a first edge of the piezoelectric resonator. A second resonator interface section of the flexure structure is in contact with a second edge of the piezoelectric resonator. The first edge and the second edge are opposite narrow edges of the piezoelectric resonator. The flexure structure exerts a load proportional to the imparted force onto the first edge of the piezoelectric resonator.

20 Claims, 7 Drawing Sheets

PASSIVE PRESSURE SENSING

TECHNICAL FIELD

The present disclosure relates generally to pressure sensing and more particularly to pressure sensing using a piezoelectric pressure transducer.

BACKGROUND

Pressure sensors (also commonly known as pressure transducers) are often used for sensing fluid pressure in applications such as oil and gas production. For example, a fluid that is monitored for pressure may apply fluid pressure on a pressure sensor, and the pressure sensor may sense the fluid pressure and generate, for example, a signal indicative of the applied fluid pressure. Some existing pressure sensors may include one or more resonators to sense fluid pressure. Generally, active electronic components are often used along with the resonators to sense the fluid pressure. However, due to the relatively low temperature tolerance of active electronic components, pressure sensors that employ active electronic components may have limited use in relatively high temperature environments. Thus, some pressure sensors that include active electronic components may have reliability issues compared to a pressure sensor that uses only passive components that are exposed to a harsh environment. Further, a pressure sensor that includes active electronic components may be relatively more expensive than a pressure sensor that uses only passive components.

Accordingly, a pressure sensor that can sense fluid pressure, for example, in an oil well using a resonator and without active components that are exposed to a harsh environment is desirable.

SUMMARY

The present disclosure relates generally to pressure sensing using a piezoelectric pressure transducer. For example, a pressure sensor may include a diaphragm separator that is exposed to a fluid pressure. The diaphragm separator may exert an imparted force proportional to the fluid pressure onto a flexure structure. To illustrate, the flexure structure, which is a deformable block, includes one or more sections that may deform (e.g., bend, curve, move, etc.) in response to the imparted force exerted by the diaphragm separator. To sense the fluid pressure, a portion of the imparted force is exerted onto a piezoelectric resonator causing a frequency change in the piezoelectric resonator that is directly proportional to the imparted force and thus to the fluid pressure.

In an example embodiment, a pressure sensor for sensing pressure of a fluid includes a diaphragm separator and a flexure structure. The diaphragm separator exerts an imparted force on the flexure structure, where the imparted force is proportional to fluid pressure exerted on the flexure structure. The pressure sensor further includes a piezoelectric resonator. A first resonator interface section of the flexure structure is in contact with a first edge of the piezoelectric resonator. A second resonator interface section of the flexure structure is in contact with a second edge of the piezoelectric resonator. The first edge and the second edge are opposite narrow edges of the piezoelectric resonator. The flexure structure exerts a load proportional to the imparted force onto the first edge of the piezoelectric resonator.

In another example embodiment, a system for measuring a pressure of a fluid includes a signal source, a signal receiver, and a pressure sensor. The pressure sensor includes a diaphragm separator and a flexure structure. The diaphragm separator exerts an imparted force on the flexure structure, where the imparted force is proportional to fluid pressure exerted on the flexure structure. The pressure sensor further includes a piezoelectric resonator. A first resonator interface section of the flexure structure is in contact with a first edge of the piezoelectric resonator. A second resonator interface section of the flexure structure is in contact with a second edge of the piezoelectric resonator. The first edge and the second edge are opposite edges of the piezoelectric resonator. The flexure structure exerts a load proportional to the imparted force onto the first edge of the piezoelectric resonator.

In another example embodiment, a method for measuring a pressure of a fluid includes generating a signal by a signal source, receiving the signal by a signal receiver through a pressure sensor, and processing the signal to determine the pressure sensed by the pressure sensor. The pressure sensor includes a diaphragm separator and a flexure structure. The diaphragm separator exerts an imparted force on the flexure structure, where the imparted force is proportional to fluid pressure exerted on the flexure structure. The pressure sensor further includes a piezoelectric resonator. A first resonator interface section of the flexure structure is in contact with a first edge of the piezoelectric resonator. A second resonator interface section of the flexure structure is in contact with a second edge of the piezoelectric resonator. The first edge and the second edge are opposite edges of the piezoelectric resonator. The flexure structure exerts a load proportional to the imparted force onto the first edge of the piezoelectric resonator. Receiving the signal through the pressure sensor includes receiving the signal through the resonator.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1A:
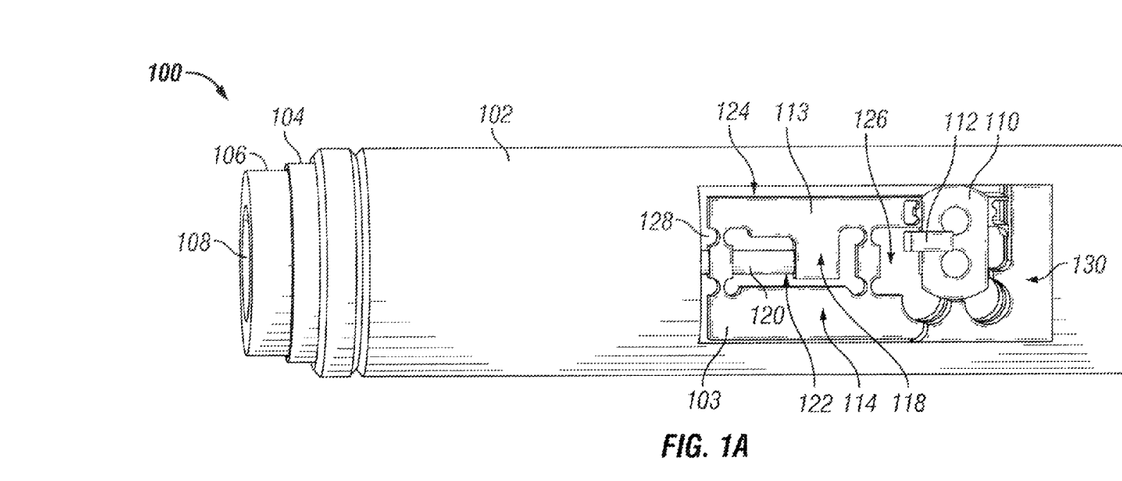
FIGS. 1A and 1B illustrate a pressure sensor for sensing a pressure of a fluid according to an example embodiment.
Figure 1B:
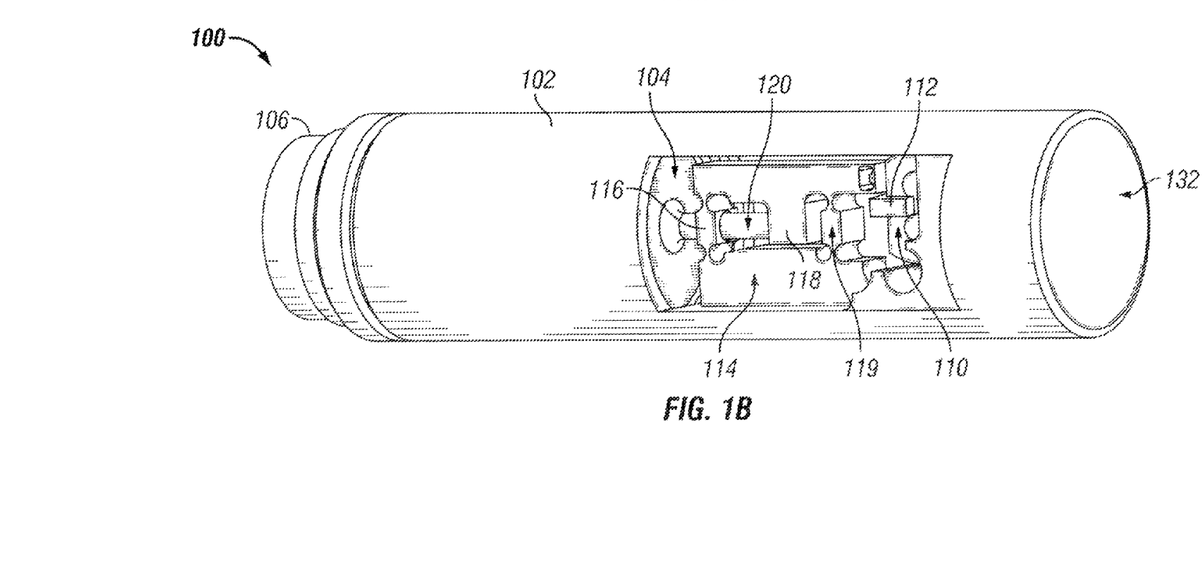

Turning now to the drawings, FIGS. 1A and 1B illustrate a pressure sensor for sensing a pressure of a fluid according to an example embodiment. The pressure sensor 100 operates by associating pressure exerted by a fluid ("outside fluid") that is outside of the pressure sensor 100 to a resonance frequency of a resonator of the pressure sensor 100. In some example embodiments, the pressure sensor 100 may be placed in the annulus portion of a well between the casing and the production tubing of a wellbore. The pressure sensor 100 is configured to sense a wide range of fluid pressure levels over a wide range of temperature conditions. In some example embodiments, the pressure sensor 100 is configured to operate in an environment having a temperature that ranges from below 32° F. (gas pressure measurements) to over 600 degrees Fahrenheit. In some example embodiments, the pressure sensor may also sense pressure levels ranging from 0 pound per square inch (PSI) to over 3,000 PSI. In some alternative embodiments, the pressure sensor may also sense pressure levels ranging from 0 pound per square inch (PSI) to over 30,000 PSI.

In some example embodiments, the pressure sensor 100 includes a flexure structure 102, a diaphragm separator 104, and a pressure head 106. The pressure sensor 100 has a fluid port 108 that may be coupled to a pipe or a similar structure to provide an interface to the outside fluid that exerts pressure on the pressure sensor 100. The pressure sensor 100 further includes a piezoelectric resonator 110 that is attached to the flexure structure 102. In some example embodiments, the flexure structure 102 includes a cavity (more clearly shown in FIG. 2), a flexure section 103, and a back end section 132. For example, a portion of the diaphragm separator 104 may be positioned within the cavity of the flexure structure 102. In some example embodiments, the pressure head 106 and the flexure structure 102 may be threaded to mate with each other. Alternatively, the pressure head 102 and the flexure structure 102 may be securely attached to each other by other means such as fasteners and soldering/brazing/welding. Similarly, diaphragm separator 104 may be threaded or otherwise similarly attached to the flexure structure 102 or may alternatively be attached by means such as fasteners and soldering/brazing/welding.

The flexure section 103 of the flexure structure 102 includes cutout areas 122, 124, 126, 128 that enable some portions of the flexure section 103 to elastically deform (e.g., move laterally) when the diaphragm separator 104 exerts an imparted force on the flexure section 103. The imparted force is proportional to the fluid pressure that is exerted on the diaphragm separator 104 as described below.

The flexure section 103 is designed to transfer, with negligible hysteresis, from the diaphragm separator 104 to the resonator 110, a force that is proportional to the fluid pressure applied on the diaphragm separator 104. To illustrate, the flexure section 103 includes an upper section 113, a lower section 114, a front section 116, a back section 119, and a middle section 118 that is disposed between the front section 116 and the back section 119. The front section 116 and the back section 119 make up a linear flexure bearing set and extend between the upper section 113 and the lower section 114. To illustrate, the front section 116 is coupled to the upper section 113 and to the lower section 114 at opposite ends of the front section 116. Similarly, the back section 119 is coupled to the upper section 113 and to the lower section 114 at opposite ends of the back section 119. The lower section 114 may be substantially fixed relative to the portion of the flexure structure 102 that is outside of the flexure section 103. The upper section may be laterally moveable relative to the lower section 114 and the portion of the flexure structure 102 that is outside of the flexure section 103.

In some example embodiments, the cutout area 124 is above the upper section 113. The cutout area 122 is fully within the flexure section 103. The cutout area 126 is between the back section 119 and a resonator attachment section (shown in FIG. 5). The cutout area 128 is adjacent to the portion of the diaphragm separator 104 that is positioned within the cavity of the flexure structure 102. In some example embodiments, the flexure section 103 also includes a backside section 130 that is attached to the lower section 114 on an opposite side of the piezoelectric resonator 110 relative to the upper section 113.

As explained above, in some example embodiments, the front section 116 and the back section 119 are coupled to the lower section 114 and to the upper section 113. The middle section 118 is attached to the upper section 113 and is intended to provide a reaction point below the upper section 113 and minimize pitch error. A portion of the cutout area 122 may be disposed between the middle section 118 and the lower section 114. Another portion of the cutout area 122 may be disposed between the middle section 118 and the front section 116. Yet another portion of the cutout area 122 may be disposed between the middle section 118 and the back section 119. In some example embodiments, the cutout area 126 may provide easier access for making other cutout areas in the flexure structure 102 and to attach the piezoelectric resonator 110 to the flexure structure 102. In some alternative embodiments, the cutout areas 122, 124, 126, 128 may have shapes other than shown in FIGS. 1A and 1B. Further, in some example embodiments, one or more of the cutout areas 122, 124, 126, 128 may be omitted or modified without departing from the scope of this disclosure.

In some example embodiments, the diaphragm separator 104 includes a protrusion 120. The protrusion 120 may extend through the front section 116 of the flexure section 103 to the middle section 118 of the flexure section 103. To illustrate, a portion of the protrusion 120 may be positioned in the cutout area 122 between the front section 116 and the middle section 118. As described in more detail below, the protrusion 120, which may be in contact with the middle section 118, may exert the imparted force on the middle section 118 of the flexure section 103. To illustrate, the protrusion 120 may move toward the piezoelectric resonator 110 in response to an increase in fluid pressure exerted on the diaphragm separator 104 and may move away from the piezoelectric resonator 110 in response to a decrease in the fluid pressure exerted on the diaphragm separator 104.

For example, the protrusion 120 may push against the middle section 118 in response to the increase in the fluid pressure exerted on the diaphragm separator 104. To illustrate, the increase in the fluid pressure exerted on the diaphragm separator 104 may result in an increase in the imparted force that is exerted by the protrusion 120 on the middle section 118. In response to the increase in the imparted force exerted by the protrusion 120, the middle section 118 and the upper section 113 may move laterally. To illustrate, the middle section 118 and the upper section 113 may move toward the piezoelectric resonator 110 in response to the increase in the imparted force exerted by the protrusion 120. Similarly, the protrusion 120 may exert less imparted force on the middle section 118 in response to a decrease in the fluid pressure exerted on the diaphragm separator 104. In response to the decrease in the imparted force exerted by the protrusion 120, the middle section 118 and the upper section 113 may be less translated or may return to their original form and position. For example, the middle section 118 and the upper section 113 may move away from the piezoelectric resonator 110 and toward the diaphragm separator 104 in response to the decrease in the imparted pressure exerted by the protrusion 120.

In some example embodiments, a load proportional to the force imparted by the protrusion 120 onto the middle section 118 of the flexure section 103 may be exerted by the flexure section 103 onto the piezoelectric resonator 110. As illustrated in FIGS. 1A and 1B, the piezoelectric resonator 110 is attached to the flexure section 103 across from the back section 119 of the flexure section 103. For example, the pressure sensor 100 may include a retainer 112 that attaches the piezoelectric resonator 110 to the flexure section 103. In some example embodiments, the piezoelectric resonator 110 may be securely attached to the resonator attachment section (shown in FIG. 5) of the flexure section 103 by the retainer 112. The piezoelectric resonator 110 may be securely attached to the flexure section 103 such that the piezoelectric resonator 110 may oscillate while attached to the flexure section 103.

In some example embodiments, the piezoelectric resonator 110 may oscillate at a frequency that corresponds to the amount of pressure/loading applied to the edges of the piezoelectric resonator 110. For example, the piezoelectric resonator 110 may oscillate at an oscillation frequency (interchangeably referred to as resonance frequency) in response to a force proportional to the fluid pressure being applied to the piezoelectric resonator 110. To maintain the structural and operational integrity of the piezoelectric resonator 110, in general, only a fraction of the force that is experienced by the diaphragm separator 104 due to the fluid pressure exerted on the diaphragm separator 104 may be exerted on the piezoelectric resonator 110. For example, when the fluid pressure exerted on the diaphragm separator 104 is 3000 PSI, the pressure exerted on the piezoelectric resonator 110 may be approximately 40 PSI. The amount of force experienced by the piezoelectric resonator 110 may be limited by engineering the stiffness of the diaphragm 104 and the stiffness of the front section 116 and the back section 119 of the flexure section 103. By allowing only a fraction of the force experienced by the diaphragm separator 104 due to fluid pressure to be exerted on the piezoelectric resonator 110, the physical integrity (thus, the functional integrity) of the piezoelectric resonator 110 can be maintained.

The oscillation frequency of the piezoelectric resonator 110 may change as the imparted force (i.e., force exerted by the diaphragm separator 104 on the middle section 118) changes in response to a change in the fluid pressure exerted on the diaphragm separator 104. In some example embodiments, the relationship between the fluid pressure and the imparted force can be used to associate an oscillation frequency of the piezoelectric resonator 110 to the fluid pressure exerted on the diaphragm separator 104. Because the oscillation frequency of the piezoelectric resonator 110 is proportional to the force exerted on the piezoelectric resonator 110, the oscillation frequency of the piezoelectric resonator 110 may be used to determine the fluid pressure exerted on the diaphragm separator 104. The fluid pressure exerted on the diaphragm separator 104 may be substantially the same as the fluid pressure of the fluid that is being sensed by the pressure sensor 100.

To illustrate, after determining a reference oscillation frequency of the piezoelectric resonator 110, for example, that corresponds to an initial amount (e.g., substantially zero) of the fluid pressure exerted on the diaphragm separator 104, changes in the fluid pressure exerted on the diaphragm separator 104 may be determined based on the corresponding change in the oscillation frequency of the piezoelectric resonator 110, for example, relative to the reference oscillation frequency. For example, the initial amount of the fluid pressure may be substantially zero or another known amount.

In some example embodiments, the length of the pressure sensor 100 may be approximately 4 inches, and the height of the pressure sensor 100 may be approximately 1 inch. In alternative embodiments, the length of the pressure sensor 100 may be larger or smaller than 4 inches, and the height of the pressure sensor 100 may be larger or smaller than 1 inch. In some example embodiments, each of the flexure structure 102, the diaphragm separator 104, and the pressure head 106 may be made from steel, such as stainless steel. The flexure section 103 including the cutout areas 122, 124, 126, 128 and other shapes and sections of the flexure structure 102 may be formed by machining (e.g., milling) a block of stainless steel that may be formed by methods such as die casting or molding. In some example embodiments, the piezoelectric resonator 110 may be a quartz resonator, such as a high frequency, thickness-shear-mode disc quartz resonator.

By using metal components and by eliminating the placement of active electronic components within the pressure sensor 100, the pressure sensor 100 allows pressure sensing to be performed, for example, in relatively high temperature environments. Further, the pressure sensor 100 may be produced more cost effectively than pressure sensors that include generally more costly active components. Although the resonator 110 is shown in FIGS. 1A and 1B as having a rectangular shape, in alternative embodiments, the resonator 110 may have various shapes without departing from the scope of this disclosure. The resonator 110 may also have various dimensions, frequency ranges, cuts, and may be made from various materials known to those of ordinary skill in the art.

Figure 2:
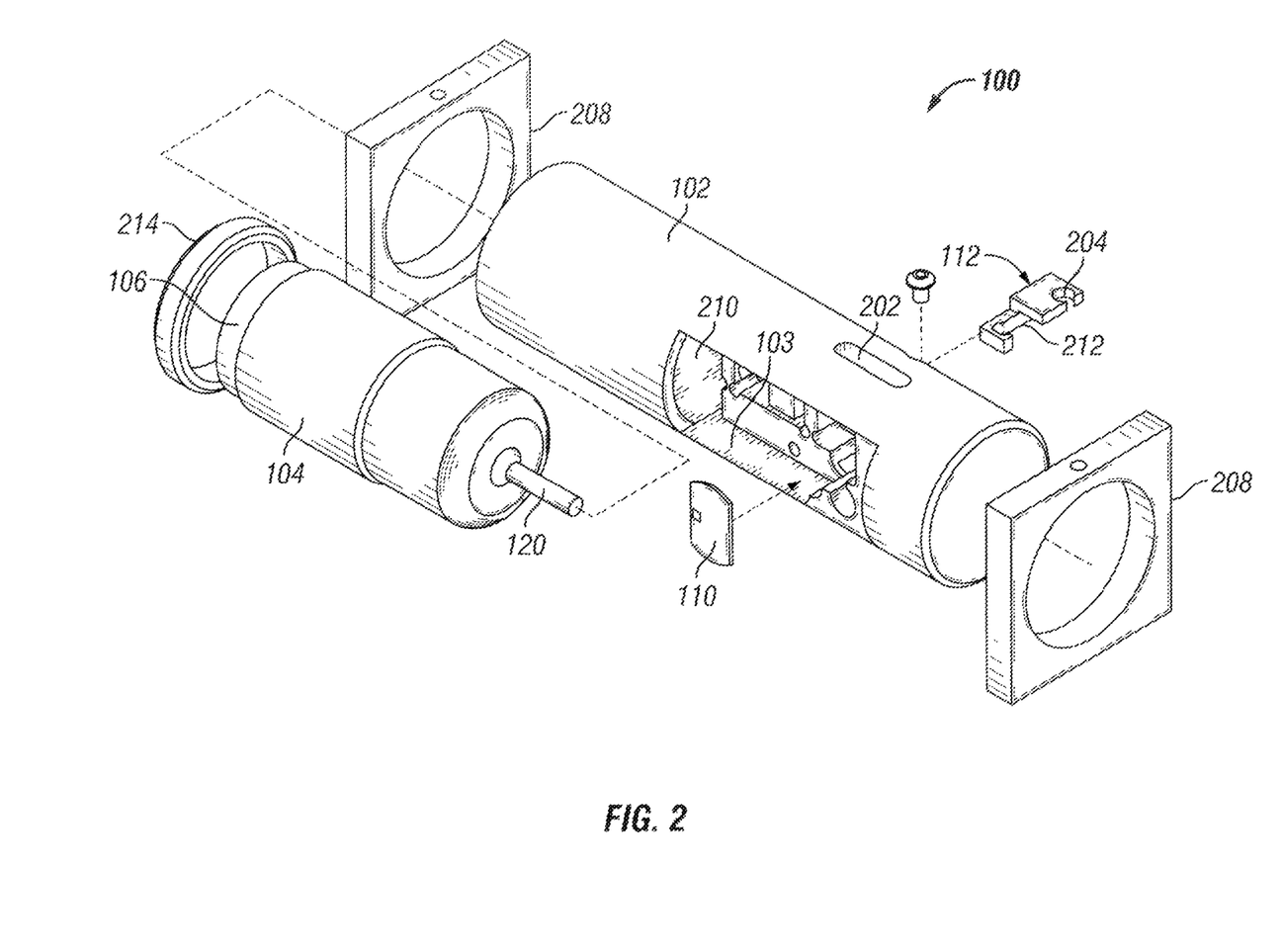
FIG. 2 illustrates an exploded view of the pressure sensor of FIG. 1 according to an example embodiment.

FIG. 2 illustrates an exploded view of the pressure sensor of FIG. 1 according to an example embodiment. Referring to FIGS. 1A, 1B, and 2, at least a portion of the diaphragm separator 104 may be positioned within the flexure structure 102. For example, the flexure structure 102 may include a cavity 210 where a portion of the diaphragm separator 104 may be positioned. In some example embodiments, at least a portion of the protrusion 120 is positioned in the flexure section 103 of the flexure structure 102 while another portion of diaphragm separator 104 is in the cavity 210 of the flexure structure 102. A portion of the pressure head 106 and a portion of the diaphragm separator 104 may be positioned outside of the flexure structure 102 at the pressure port 108 of the pressure sensor 100.

In some example embodiments, the pressure sensor 100 may include an opening 202. The opening 202 may provide access during the process of forming the flexure section 103 and during the process of attaching the piezoelectric resonator 110 to the resonator attachment section (shown in FIG. 5) of the flexure section 103 using the retainer 112. In some example embodiments, the retainer 112 includes a hole 204 for securely attaching the retainer 112 to the flexure structure 102. For example, a fastener 206 may be used to attach the retainer 112 to the flexure structure 102 by inserting the fastener 206 through the hole 204. The retainer 112 also includes a gap 212. The piezoelectric resonator 110 is positioned in the gap 212 when the piezoelectric resonator 110 is securely attached to the flexure structure 102. Although the hole 204 is not fully enclosed as shown in FIG. 2, in alternative embodiments, the hole 204 may be a fully enclosed hole. Further, in some alternative embodiments, a means other than use of the retainer 112 may be used to attach the piezoelectric resonator 110 to the flexure structure 102.

Figure 3:
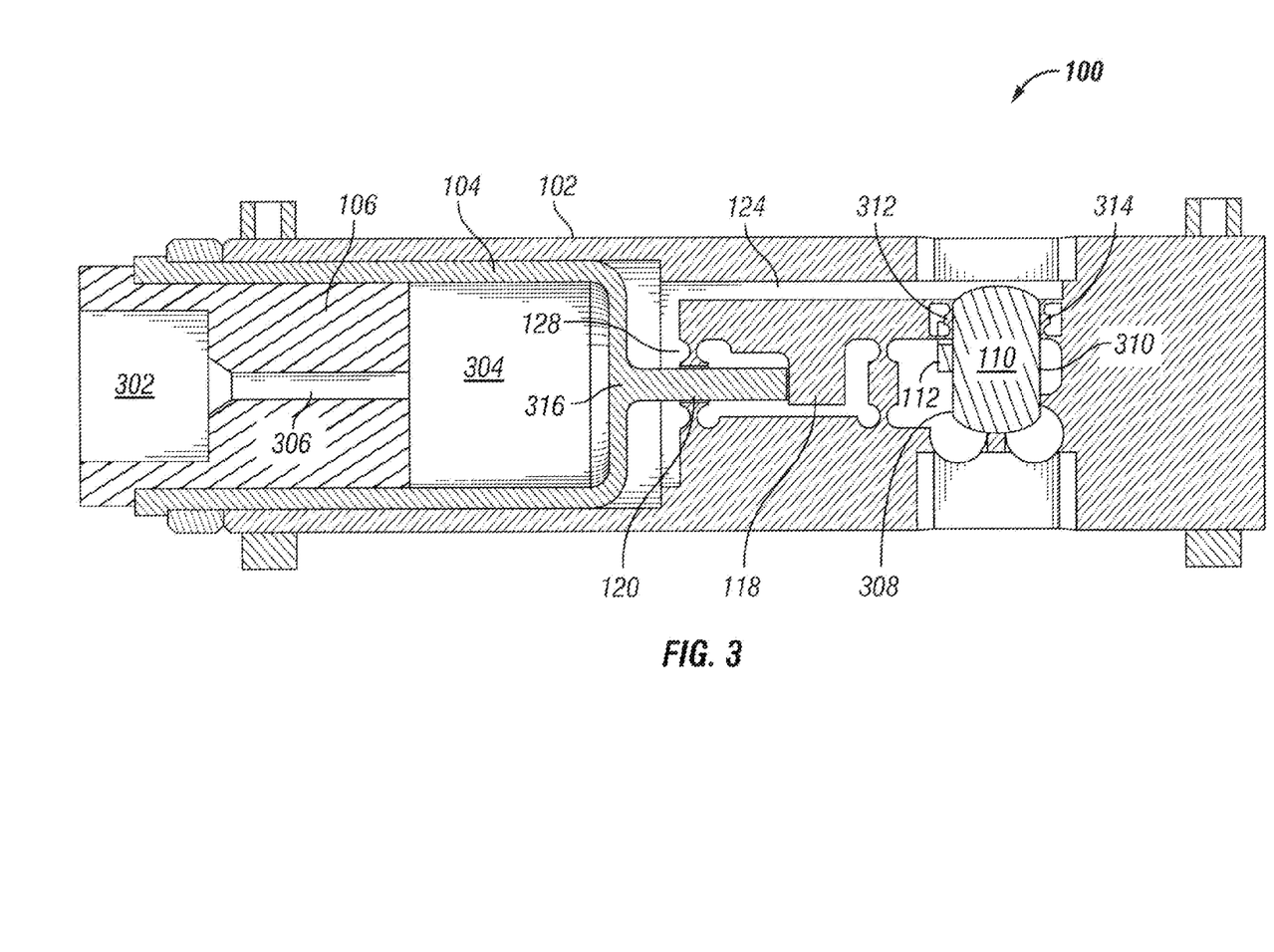
FIG. 3 illustrates a longitudinal cross-section of the pressure sensor of FIG. 2 according to an example embodiment.

In some example embodiments, the pressure sensor 100 includes stands 208 that are positioned at opposite ends of the pressure sensor 100. The stands 208 may hold the flexure structure 102 elevated from a surface such as a surface of a housing (not shown) that may contain the pressure sensor 100. For example, the pressure sensor 100 may be enclosed in an outer housing or sleeve (not shown) that protects the pressure sensor 100 from exposure to the outside fluid. As illustrated in FIG. 3, each stand 208 may have a rectangular outer shape and a substantially circular inner shape that is designed to annularly fit around the flexure structure 102. The stands 208 may have an outer shape such that the stands may be stably positioned with the housing. In some alternative embodiments, the stands 208 may have outer and inner shapes other than shown in FIG. 2 without departing the scope of this disclosure. The stands 208 may be made from stainless steel or another suitable material.

FIG. 3 illustrates a longitudinal cross-section of the pressure sensor 100 of FIGS. 1A, 1B, and 2 according to an example embodiment. As illustrated in FIG. 3, a portion of the pressure head 106 is positioned within the diaphragm separator 104, and a portion of the diaphragm separator 104 is positioned within the flexure structure 102. For example, the pressure head 106 and the flexure structure 102 may be threaded or otherwise attached to each other and/or by other means such as fasteners and soldering/brazing/welding. Similarly, diaphragm separator 104 may be threaded or otherwise attached to the flexure structure 102 by other means such as fasteners and soldering/brazing/welding.

In some example embodiments, the pressure head 106 may include a fluid inlet 302 that may be coupled to a pipe (shown in FIG. 10) that connects the pressure sensor 100 to the outside fluid that is monitored for pressure. For example, the pipe may be coupled to a structure that is exposed to the outside fluid and isolates the pressure sensor 100 from the outside fluid. The pressure head 106 may also include a channel 306 extending between the fluid inlet 302 and a chamber 304. As illustrated in FIG. 3, the chamber 304 is partially bounded by the diaphragm separator 104. The chamber 304 may contain an isolation fluid (not shown) that is separated by a separator structure (for example, a bellows) from the outside fluid that is monitored for pressure. The fluid is also isolated from the piezoelectric resonator 110. The fluid may also be isolated from the flexure structure 102.

In some example embodiments, the fluid contained in the chamber 304 may exert fluid pressure on the diaphragm separator 104. For example, the exerted fluid pressure may be substantially the same level of pressure exerted by the outside fluid that is monitored for pressure. The fluid in the chamber 304 may, for example, be a hydraulic fluid. When a separator structure is used, the separator structure may be positioned, for example, within the fluid inlet 302 or outside of the pressure sensor 100. In some alternative embodiments, instead of an isolation fluid, the chamber 304 may contain the outside fluid. To illustrate, in some embodiments, the separator structure may be omitted.

In some example embodiments, the pipe (shown in FIG. 10) that is attached to the fluid inlet 302 may contain the same fluid that is contained in the chamber 304. For example, the pipe may serve as a passageway to transfer pressure from the outside fluid to the fluid contained in the chamber 304. To illustrate, the pressure of the outside fluid can be transferred to an isolation fluid contained in the chamber 304 through the isolation fluid in the pipe as well as in the channel 306. Although a single channel and a single fluid inlet are shown in FIG. 3, in alternative embodiments, the pressure head 106 may include multiple channels 306 and/or multiple fluid inlets 302. Further, in some alternative embodiments, the pressure head 106 may include multiple fluid inlets and/or multiple chambers that are partially bounded by the diaphragm separator 204.

In some example embodiments, the diaphragm separator 204 includes an end wall 316. To illustrate, the end wall 316 may be designed to move toward the piezoelectric resonator 110 in response to an increase in the fluid pressure exerted by the fluid contained in the chamber 304. The protrusion 120 extending out from the end wall 316 may also move laterally along with the end wall 316 and toward the piezoelectric resonator 110 in response to the increase in the fluid pressure exerted by the fluid contained in the chamber 304. The fluid pressure exerted on the end wall 316 results in the diaphragm separator 104 imparting a force onto the flexure structure 102. For example, the imparted pressure may be proportional to the fluid pressure exerted on the diaphragm separator 104, which is the same or substantially the same as the fluid pressure of the outside fluid.

To illustrate, in response to an increase in the fluid pressure of the outside fluid that results in the end wall 316 moving laterally toward the piezoelectric resonator 110, the protrusion 120 may exert pressure on the middle section 118 of the flexure structure 102. For example, the protrusion 120 may be in contact or already pushing on the middle section 118 prior to an increase in the fluid pressure. The pressure exerted on the middle section 118 by the protrusion 120 may in turn result in the flexure structure 102 exerting pressure on a first edge 308 and on a second edge 310 of the piezoelectric resonator 110. As shown in FIG. 3, the first edge 308 and the second edge 310 are opposite narrow edges of the piezoelectric resonator 110.

In some example embodiments, a first resonator interface section 312 of the flexure structure 102 is in physical contact with the first edge 308 of the piezoelectric resonator 110, and a second resonator interface section 314 of the flexure structure 102 is in physical contact with the second edge 310 of the piezoelectric resonator 110. In alternative embodiments, the first resonator interface section 312 and the first edge 308 may not be in direct physical contact, and may instead be in indirect contact with each other. Similarly, in some alternative embodiments, the second resonator interface section 314 and the second edge 310 may not be in direct physical contact, and may instead be in indirect contact with each other.

When the protrusion 120 exerts a force on the middle section 118 in response to the fluid pressure exerted on the end wall 316 of the diaphragm separator 104, the first resonator interface section 312 exerts a load proportional to the imparted pressure edgewise on the piezoelectric resonator 110. The second resonator interface section 314 also exerts the same amount of force (reactive force) edgewise on the piezoelectric resonator 110. The cutout areas 124, 128 along with the cutout area 122, 124 (shown in FIG. 1A) enable some portions of the flexure structure 102 including the middle section 118 to move laterally (e.g., move relative to other sections of the flexure structure 102) when the protrusion 120 imparts a force onto the middle section 118 that is proportional to fluid pressure exerted on the diaphragm separator 104. To illustrate, in response to an increase in pressure of the outside fluid, the end wall 316 along with the protrusion 120 may move laterally toward the first edge 308 of the piezoelectric resonator 110, thereby exerting more force on the middle section 118 of the flexure structure 102. In turn, the flexure structure 102 may exert more force edgewise on the piezoelectric resonator 110.

In response to a decrease in the fluid pressure exerted on the end wall 316 of the diaphragm separator 104, the end wall 316 along with the protrusion 120 may move laterally away from the first edge 308 of the piezoelectric resonator 110, thereby exerting less force on the middle section 118 of the flexure structure 102. In turn, the flexure structure 102 may exert less pressure on the piezoelectric resonator 110. Because the piezoelectric resonator 110 is securely attached to the flexure structure 102 using the retainer 112, the piezoelectric resonator 110 oscillates in response to and in proportion to the force that is edgewise exerted on the piezoelectric resonator 110.

Because the force imparted to the flexure structure 102 by the protrusion 120 is proportional to the fluid pressure exerted on the diaphragm separator 104, the fluid pressure exerted on the diaphragm separator 104, and thus the fluid pressure of the outside fluid, may be determined based on the oscillation frequency of the piezoelectric resonator 110. To illustrate, the oscillation frequency of the piezoelectric resonator 110 is proportional to the imparted force (i.e., the force exerted by the protrusion 120 of the diaphragm separator 104 on the flexure structure 102). As a result of the imparted force exerted by the protrusion 120 of the diaphragm separator 104 on the flexure structure 102, a load proportional to the imparted force is exerted on the first edge 308 of the piezoelectric resonator 110 by the first resonator interface section 312, and an equal amount of reactive force is exerted on the second edge 310 by the second resonator interface section 314. Thus, because the imparted force is proportional to the fluid pressure exerted on the diaphragm separator 104, and because the oscillation frequency of the piezoelectric resonator 110 is proportional to the load exerted on the piezoelectric resonator 110, which is proportional to the imparted force, the fluid pressure exerted on the diaphragm separator 104 may be determined based on the oscillation frequency of the piezoelectric resonator 110.

In some example embodiments, the pressure imparted to the flexure structure 102 by the diaphragm separator 104 may depend on the thickness of the end wall 316. As an illustrative example, the end wall 316 may have a thickness in the range of 0.059 inch to 0.062 inch. For example, the pressure sensor 100 that has the diaphragm separator 104 with the end wall 316 having a thickness of 0.059 inch to 0.062 inch may be used in sensing up to 3000 PSI of fluid pressure exerted by the outside fluid. In general, a larger thickness of the end wall 316 may result in a smaller amount of force being imparted by the diaphragm separator 104 onto the flexure structure 102, which may result in a greater amount of fluid pressure that may be sensed by the pressure sensor 100.

Figure 4:
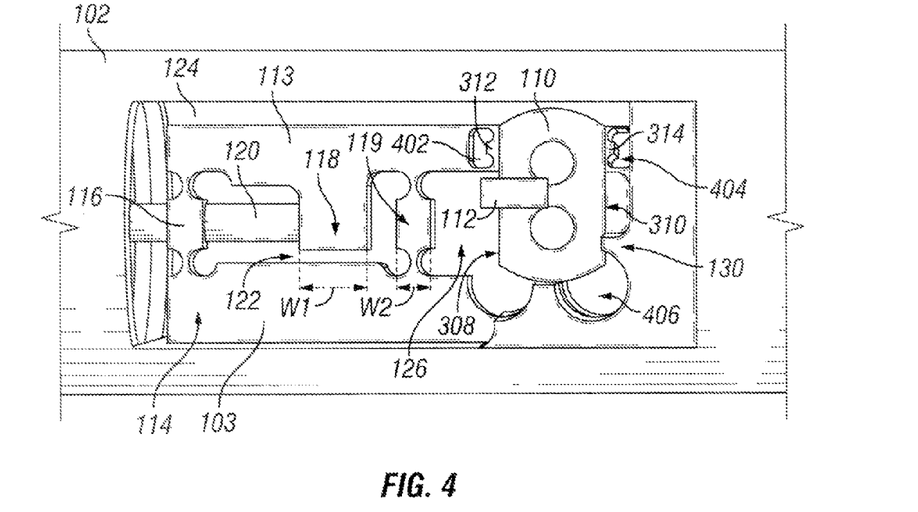
FIG. 4 illustrates a close-up view of a portion of the pressure sensor of FIGS. 1A and 1B according to an example embodiment.

FIG. 4 illustrates a close-up view of a portion of the pressure sensor of FIGS. 1A and 1B according to an example embodiment. As illustrated in FIG. 4, the flexure section 103 of the flexure structure 102 includes the upper section 113 and the lower section 114. The front section 116 and the back section 119 extend between the upper section 113 and the lower section 114. The front section 116 is proximal to the end wall 316 (shown in FIG. 3) of the diaphragm separator, and the back section 119 is distal from the end wall 316 of the diaphragm separator. The middle section 118 is disposed between the front section 116 and the back section 119 and extends down from the upper section 113. The cutout areas 122, 124, 126, 128 enable portions of the flexure section 103 such as the middle section 118 to move in response to the force imparted by the protrusion 120. In some alternative embodiments, the cutout areas 122, 124, 126, 128 may have shapes and relative sizes other than shown in FIG. 4 without departing from the scope of this disclosure. For example, in some example embodiments, the amount of load exerted on the piezoelectric resonator 110 may be different based on the size of one or more of the cutout areas 122, 124, 126, 128, which may affect the dimensions of the middle section 118 and or the back section 119. Further, in some example embodiments, one or more of the cutout areas 122, 124, 126, 128 may be omitted without departing from the scope of this disclosure.

In some example embodiments, the edge 308 of the piezoelectric resonator 110 is in contact with only the first resonator interface section 312 of the flexure structure 102, and the edge 310 of the piezoelectric resonator 110 is in contact with only the second resonator interface section 314 of the flexure structure 102. The first resonator interface section 312 of the flexure structure 102 includes a cutout area 402, and the second resonator interface section 314 of the flexure structure 102 includes a cutout area 404. The cutout areas 402, 404 are shaped such that the pressure applied to the edges 308, 310 of the piezoelectric resonator 110 is spread across the contact area between the edges 308, 310 and the resonator interface sections 312, 314. In some alternative embodiments, the first resonator interface section 312 of the flexure structure 102 may be in contact with the edge 308 of the piezoelectric resonator 110 at a location along the edge 308 other than shown in FIG. 4. Similarly, the second resonator interface section 314 of the flexure structure 102 may be in contact with the edge 310 of the piezoelectric resonator 110 at a location along the edge 310 other than shown in FIG. 4. In some example embodiments, the flexure structure 102 may include more than one section that is in contact with each edge 308, 310 of the piezoelectric resonator 110. As illustrated in FIG. 4, the piezoelectric resonator 110 is securely attached to the flexure structure 102 by the retainer 112.

In some example embodiments, the flexure section 103 includes the backside section 130, and the second resonator interface section 314 may be attached to the backside section 130 as illustrated in FIG. 4. The flexure section 103 may also include a cutout area 406 that may be used, along with one or more of the other cutout areas 122, 124, 126, 128 during the process of forming the flexure section 103 and during the process of attaching the piezoelectric resonator 110 to flexure structure 102.

As illustrated in FIG. 4, the protrusion 120 may extend through the front section 116 of the flexure section 103 to the middle section 118 of the flexure section 103. For example, a portion of the protrusion 120 may be positioned in the cutout area 122 between the front section 116 and the middle section 118. As described above, the protrusion 120 may exert pressure on the middle section 118 of the flexure section 103 in response to fluid pressure exerted on the end wall 316 (shown in FIG. 3) by a fluid contained in the chamber 304 (shown in FIG. 3). To illustrate, the protrusion 120 may move toward the piezoelectric resonator 110 in response to an increase in the fluid pressure exerted on the diaphragm separator 104 and may move away from the piezoelectric resonator 110 while remaining in contact with the middle section 118 in response to a decrease in the fluid pressure exerted on the diaphragm separator 104.

For example, in response to a change in the pressure exerted by the protrusion 120 on the middle section 118, the middle section 118 may be move laterally toward or away from the piezoelectric resonator 110. In some example embodiments, the amount of load applied to the piezoelectric resonator 110 may depend on the width W1 of the middle section 118 and the width W2 of the back section 119. As an illustrative example, the width W1 may be approximately 0.2 inch and the width W2 may be approximately 0.1 inch when the pressure sensor 100 is designed to sense up to 3000 PSI of outside fluid pressure.

Figure 5:
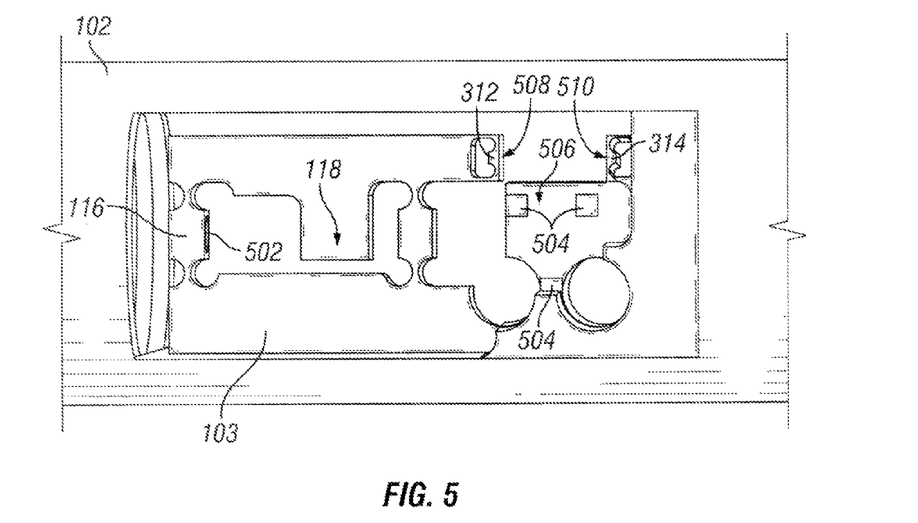
FIG. 5 illustrates a close-up view of a portion of the pressure sensor of FIGS. 1A and 1B without a diaphragm separator and a resonator according to an example embodiment.

FIG. 5 illustrates a close-up view of a portion of the pressure sensor of FIGS. 1A and 1B without the diaphragm separator 104 and the piezoelectric resonator 110 according to an example embodiment. As illustrated in FIG. 5, the flexure structure 102 includes a resonator attachment section 506 that includes pads 504. When the piezoelectric resonator 110 (shown in FIG. 4) is attached to the flexure structure 102, a broad side of the piezoelectric resonator 110 is positioned against the pads 504, and the piezoelectric resonator 110 is securely attached to the resonator attachment section 506 by the retainer 112 (shown in FIG. 4). In some example embodiments, the retainer 112 is attached to the resonator attachment section 506 by the fastener 206 shown in FIG. 2. The pads 504 protrude out from the resonator attachment section 506 such that the broad side of the piezoelectric resonator 110 is in contact with the resonator attachment section 506 only at the pads 504.

As illustrated in FIG. 5, the first resonator interface section 312 includes a surface 508 that is in contact with the edge 308 of the piezoelectric resonator 110 when the piezoelectric resonator 110 is attached to the resonator attachment section 506 of the flexure structure 102. Similarly, the second resonator interface section 314 includes a surface 510 that is in contact with the edge 310 of the piezoelectric resonator 110 when the piezoelectric resonator 110 is attached to the resonator attachment section 506 of the flexure structure 102.

As illustrated in FIG. 5, the front section 116 of the flexure section 103 includes an opening 502 through which the protrusion 120 (shown in FIG. 4) of the diaphragm separator 104 extends to come in contact with the middle section 118. For example, the opening 502 may have a larger diameter than the protrusion 120.

Figure 6:
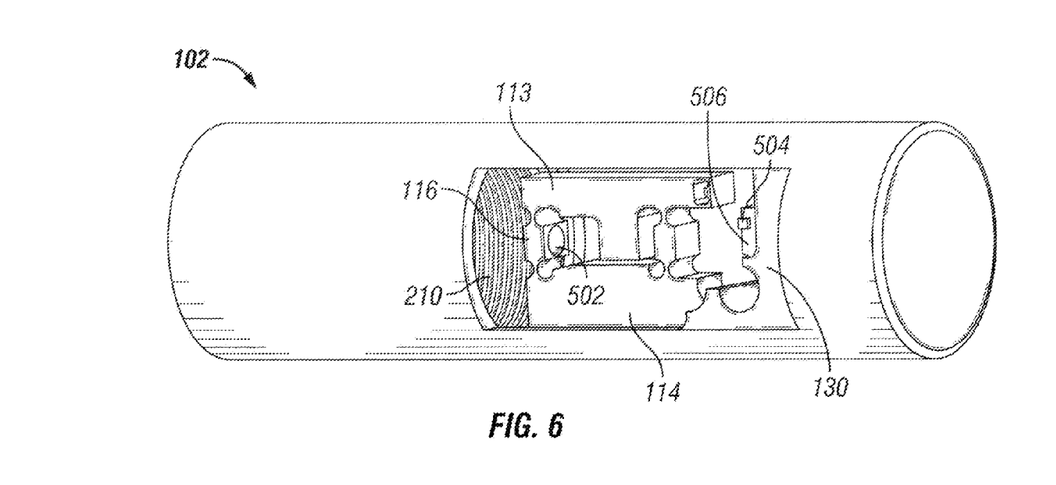
FIG. 6 is a perspective view of a flexure structure of FIGS. 1A and 1B according to an example embodiment.

FIG. 6 is a perspective view of the flexure structure 102 of FIGS. 1A and 1B without the diaphragm separator 104 and the piezoelectric resonator 110 according to an example embodiment. As illustrated in FIG. 6, the flexure structure 102 (shown in FIG. 1A) includes the cavity 210 where a portion of the diaphragm separator 104 may be positioned as illustrated in FIG. 2. The front section 116 extends between the upper section 113 and the lower section 114. The front section 116 includes the opening 502 through which the protrusion 120 (shown in FIG. 4) of the diaphragm separator 104 extends. As illustrated in FIG. 6, the pad 504 extends out from the resonator attachment section 506 that is attached to the backside section 130.

Figure 7:
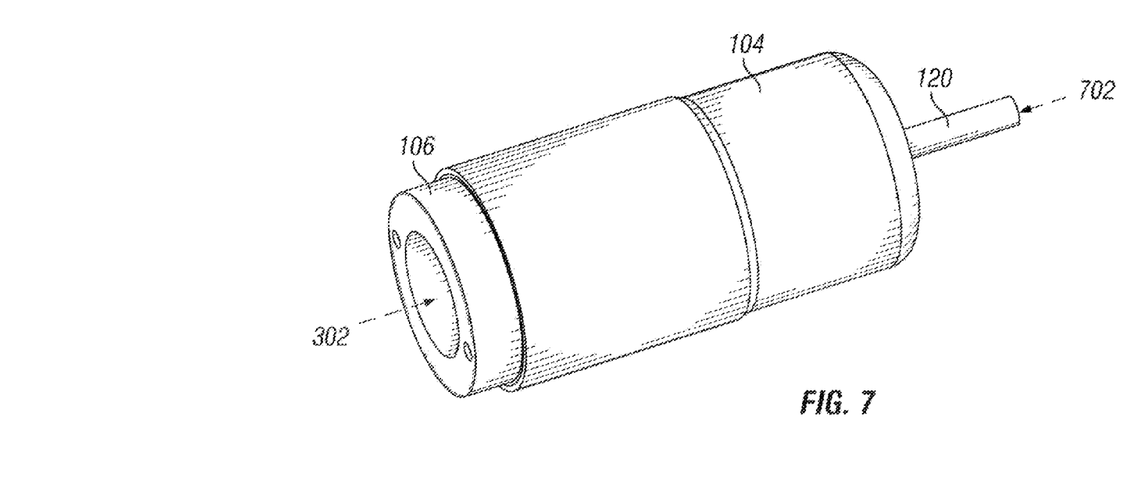
FIG. 7 illustrates a diaphragm separator and a pressure head of the pressure sensor of FIGS. 1A and 1B according to an example embodiment.

FIG. 7 illustrates the diaphragm separator 104 and the pressure head 106 of the pressure sensor 100 of FIGS. 1A and 1B according to an example embodiment. As illustrated in FIG. 7, a portion of the diaphragm separator 104 may have a substantially cylindrical shape, and the pressure head 106 may have an outer shape such that a portion of the pressure head 106 fits within the diaphragm separator 104 and in contact an inner surface of the diaphragm separator 104. The protrusion 120 includes a tip 702 that comes in contact with the flexure structure 102 and that imparts a force proportional to the fluid pressure exerted on the diaphragm separator 104 from within the diaphragm separator 104 to the flexure structure 102 as described above. In some example embodiments, the protrusion 120 may be cylindrical and may have a diameter of approximately 1 inch. In some example embodiments, the tip 702 may have a curvature. For example, the radius of the curvature of the tip 702 may be approximately 0.19 inch. As described above, the fluid inlet 302 of the pressure head 106 may be coupled to a pipe (shown in FIG. 10) or another structure that proves a passageway to transfer pressure from the outside fluid to the fluid contained in the chamber 304 shown in FIG. 3.

Figure 8:
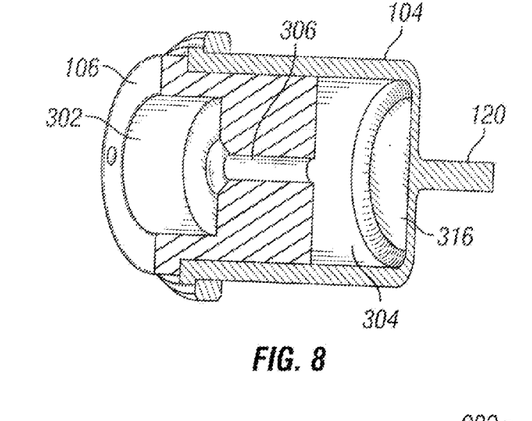
FIG. 8 illustrates a cross-section of the diaphragm separator and the pressure head of FIG. 7 according to an example embodiment.

FIG. 8 illustrates a cross-section of the diaphragm separator 104 and the pressure head 106 of FIG. 7 according to an example embodiment. As illustrated in FIG. 8, the pressure head 106 includes the channel 306 extending between the fluid inlet 302 and the chamber 304. The chamber 304 is defined by the walls of the diaphragm separator 104 and the pressure head 106. The protrusion 120 extends out from the end wall 316 of the diaphragm separator 104.

Figure 9:
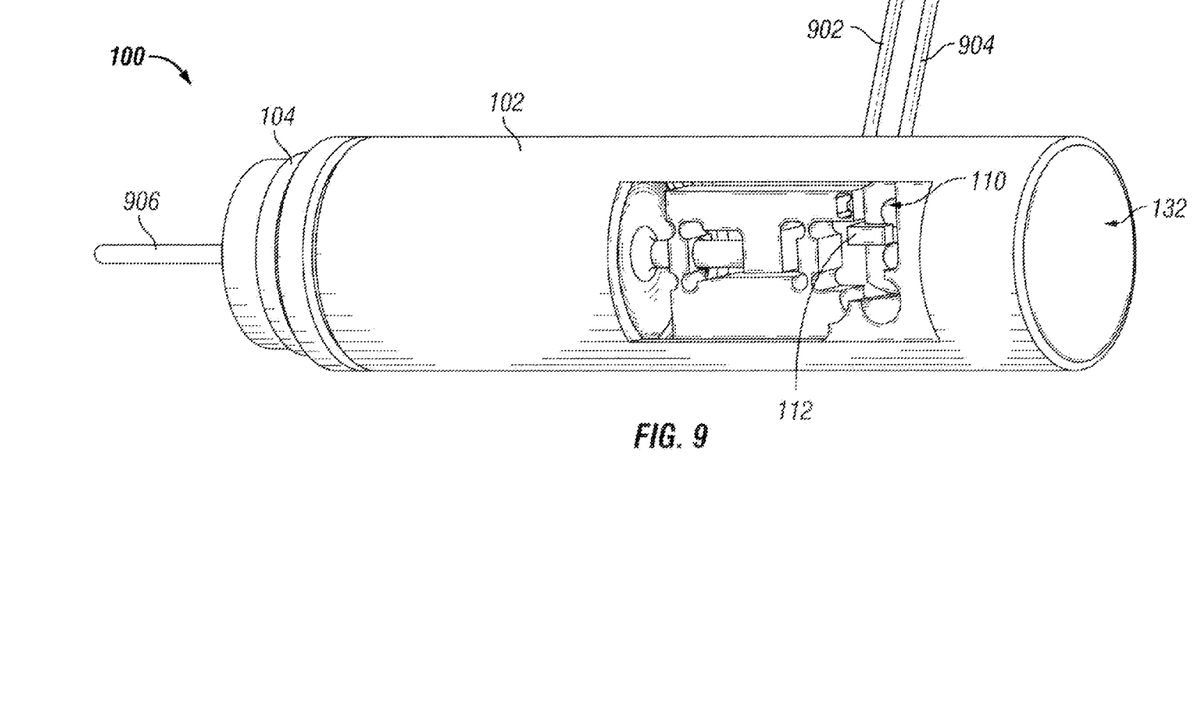
FIG. 9 is a perspective view of the pressure sensor of FIGS. 1A and 1B illustrating electrical wires coupled to the pressure sensor according to an example embodiment.

FIG. 9 is a perspective view of the pressure sensor 100 of FIGS. 1A and 1B including electrical wires coupled to the pressure sensor according to an example embodiment. As explained above, the pressure sensor 100 may be placed in the annulus portion of a well between the casing and the production tubing of a wellbore. As illustrated in FIG. 9, wires 902, 904 may be coupled to the pressure sensor 100. To illustrate, the wire 902 may be coupled to one terminal of the piezoelectric resonator 110, and the wire 904 may be coupled to the other terminal of the piezoelectric resonator 110. For example, the wire 902 may be coupled to the flexure structure 102, which may be electrically coupled to (i.e., in electrical communication with) a terminal of the piezoelectric resonator 110 to provide an electrical ground connection. The wire 904 may be electrically coupled to the other terminal directly. For example, the wire 904 may electrically couple a terminal of the piezoelectric resonator 110 to a production tubing (e.g., a steel pipe) of an oil well that may be used to carry a signal between the pressure sensor 100 and, for example, a signal source/receiver that may be above ground. In some example embodiments, one or both wires 902, 904 may be routed to the piezoelectric resonator 110 through a passageway that may be formed in the flexure structure 102, for example through the back end section 132.

As illustrated in FIG. 9, a pipe 906 may be attached to the pressure head 106, which is attached to the diaphragm separator 104. For example, the pipe 906 may contain the same fluid that is contained in the chamber 304 (shown in FIG. 3) and may serve as a passageway to transfer pressure from the outside fluid to the fluid contained in the chamber 304. As explained above, in some example embodiments, the fluid pressure exerted by the outside fluid may be determined based on the resonance frequency of the piezoelectric resonator 110. The wires 902, 904 may be used to carry a signal that is used to determine the resonance frequency of the piezoelectric resonator 110.

Figure 10:
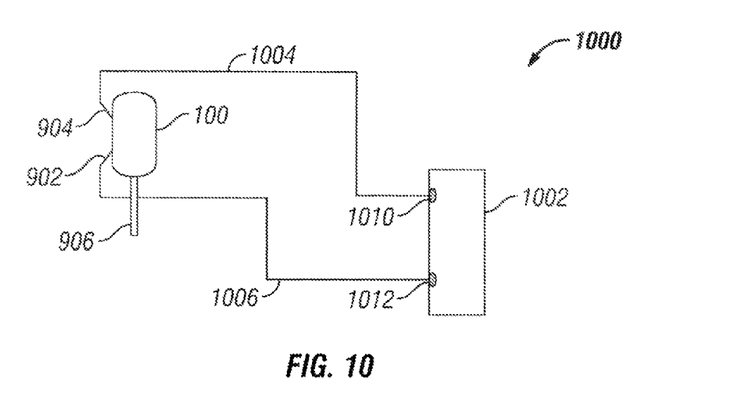
FIG. 10 illustrates a system for measuring a pressure of a fluid using the pressure sensor of FIGS. 1A and 1B according to an example embodiment.

FIG. 10 illustrates a system 1000 for measuring a pressure of a fluid using the pressure sensor of FIGS. 1A and 1B according to an example embodiment. The system 1000 includes a network analyzer 1002 and the pressure sensor 100. In an example embodiment, the network analyzer 1002 includes a signal source that generates a signal and a signal receiver that receives a signal. For example, the network analyzer 1002 may output a signal via the first port 1010 and may receive a signal via the second port 1012. Alternatively, the network analyzer 1002 may output a signal via the second port 1012 and may receive a signal via the first port 1010. To illustrate, the first port 1010 and the second port 1012 may be electrically coupled to the piezoelectric resonator 110 (shown in FIG. 1A) of the pressure sensor 100. For example, the first port 1010 may be electrically coupled to the piezoelectric resonator 110.

In some example embodiments, the first port 1010 may be electrically coupled to terminal of the piezoelectric resonator 110 of the pressure sensor 100 via an electrical connection 1004 that may be coupled to or that includes the wire 904. Similarly, the second port 1012 of the network analyzer 1002 may be electrically coupled to the other terminal of the piezoelectric resonator 110 via an electrical connection 1006 that may be coupled to or that includes the wire 902. In some example embodiments, the electrical connection 1004 may include a production tubing of an oil well, and the electrical connection 1006 may include a casing of the oil well. When the pressure sensor 100 is positioned in the annulus between the casing and the production tubing, the casing of the oil well may be electrically connected to flexure structure 102 of the pressure sensor 100 that is also electrically coupled to a terminal (e.g., ground terminal) of the piezoelectric resonator 110.

In some example embodiments, the network analyzer 1002 may send a signal to the piezoelectric resonator 110 via the electrical connection 1006 and may receive the signal from the piezoelectric resonator 110 via the electrical connection 1004. In some alternative embodiments, the network analyzer 1002 may send a signal to the piezoelectric resonator 110 via the electrical connection 1004 and may receive the signal from the protrusion 120 via the electrical connection 1006. The network analyzer 1002 may vary the frequency of the signal provided to the protrusion 120 to sweep through a range of frequencies to determine the resonance frequency of the piezoelectric resonator 110, which is indicative of the pressure sensed by the pressure sensor 100.

To illustrate, as explained above, the resonance frequency of the resonator piezoelectric resonator 110 of the pressure sensor 100 depends on the pressure/load applied edgewise to the piezoelectric resonator 110. By first determining a reference resonance frequency of the piezoelectric resonator 110 that corresponds to a reference fluid pressure of the outside fluid that is monitored for pressure, changes in the fluid pressure of the outside fluid may be determined by determining changes in the resonance frequency of the piezoelectric resonator 110. The amount of change in the fluid pressure may be determined based on the particular resonance frequency relative to the reference resonance frequency. In some example embodiments, the pressure sensor 100 may be connected to the outside fluid to be monitored for pressure via the pipe 906.

By performing a frequency sweep (i.e., by varying the frequency) of the signal generated by the network analyzer 1004 and processing the signal received by the network analyzer 1004 through the pressure sensor 100 (i.e., through the piezoelectric resonator 110), a resonance frequency that is indicative of the fluid pressure may be determined. For example, the resonance frequency of the piezoelectric resonator 110 may be determined by processing the signal, after the signal is received by the network analyzer 1002, to determine one or more parameters, such as voltage level, power, and/or frequency of the signal.

In an example embodiment, the network analyzer 1002 can process the signal received through the pressure sensor 100 to determine one or more parameters and to further determine the pressure sensed by the pressure sensor 100 based on the one or more parameters. Alternatively, the network analyzer 1002 may determine the one or more parameters of the signal and pass the parameter(s) and/or other information to another device to determine the pressure of a fluid sensed by the pressure sensor 100. Those of skill in the art will appreciate that a conventional computing device comprising one or more processors and one or more memory devices may be included in or operated with the network analyzer 1002. In some example embodiments, the network analyzer 1002 may also include communication modules for wired or wireless communications with other local or remote computing devices.

In some alternative embodiments, instead of the network analyzer 1002, separate signal source and signal receiver may be used to send and receive the signal to/from the pressure sensor 100. Further, in some embodiments, the connection 1006 may be at an electrical ground potential and may be coupled to an electrical ground.

Figure 11:
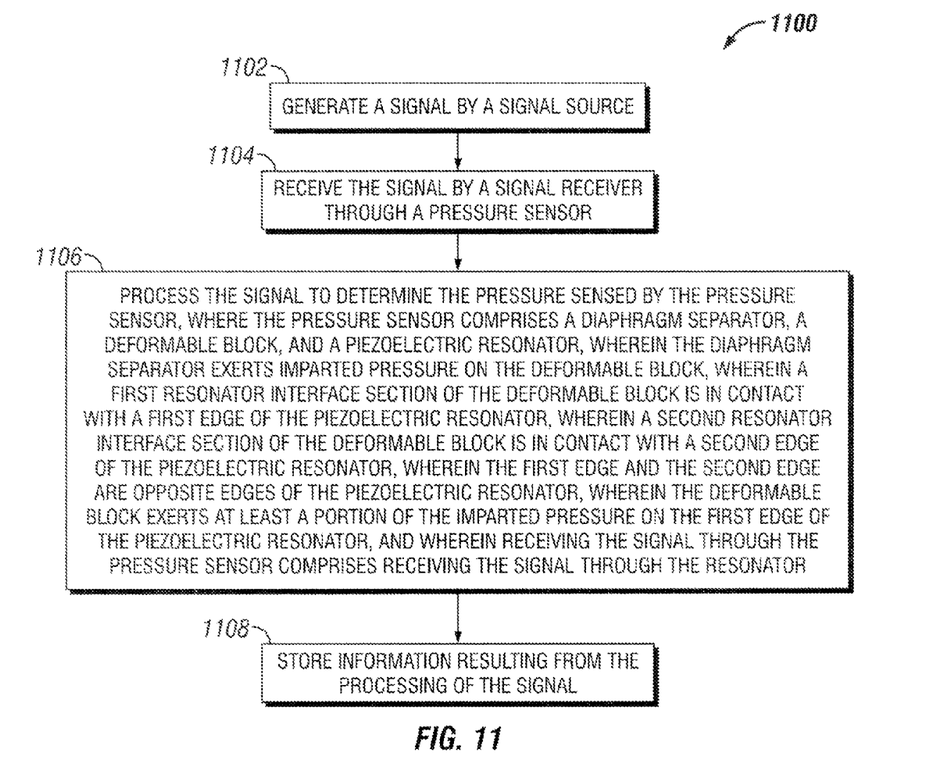
FIG. 11 illustrates a method for measuring a pressure of a fluid according to an example embodiment.

FIG. 11 illustrates a method for measuring a pressure of a fluid according to an example embodiment. The method 1100 includes generating a signal by a signal source, at 1102. For example, the network analyzer 1002 of FIG. 10 may generate a signal that is provided to a resonator (e.g., the piezoelectric resonator 110 of FIG. 1A) of the pressure sensor 100 of FIG. 1A. The method 1100 also includes receiving the signal by a signal receiver through a pressure sensor, at 1104. For example, the network analyzer 1002 may receive the signal through the pressure sensor 100. To illustrate, the network analyzer 1002 may receive the signal through the piezoelectric resonator 110 illustrated in FIG. 1A.

At 1006, the method 1100 includes processing the signal to determine the pressure sensed by the pressure sensor. For example, the network analyzer 1002 of FIG. 1000 may process the signal received through the piezoelectric resonator 110 to determine the pressure sensed by the pressure sensor 100. For example, processing the signal to determine the pressure sensed by the pressure sensor may include determining one or more parameters of the signal, such as the voltage level, power, and/or frequency of the signal at one or both of the signal source and the signal receiver. To illustrate, processing the signal may include determining a voltage level of the signal after the signal is received by the signal receiver. In some example embodiments, the method 1100 also includes varying a frequency of the signal by the signal source to determine the resonance frequency of the resonator of the pressure sensor 100. For example, the pressure sensed by the pressure sensor 100 can be determined based on the frequency of the signal, which may be indicative of the pressure sensed by the pressure sensor when the frequency of the signal matches the resonant frequency of the piezoelectric resonator 110 of the pressure sensor 100, as described above.

At 1108, the method 1100 concludes with storing the information resulting from the processing. For example, the information may be stored in a memory, such as a static random access memory.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A pressure sensor for sensing pressure of a fluid, the pressure sensor comprising:
    a diaphragm separator;
    a flexure structure, wherein the diaphragm separator exerts an imparted force on the flexure structure, wherein the imparted force is proportional to fluid pressure exerted on the flexure structure; and
    a piezoelectric resonator, wherein a first resonator interface section of the flexure structure is in contact with a first edge of the piezoelectric resonator, wherein a second resonator interface section of the flexure structure is in contact with a second edge of the piezoelectric resonator, wherein the first edge and the second edge are opposite narrow edges of the piezoelectric resonator, and wherein the flexure structure exerts a load onto the first edge of the piezoelectric resonator, wherein the load is proportional to the imparted force.

2. The pressure sensor of claim 1, wherein a portion of the diaphragm separator is positioned within a cavity of the flexure structure.

3. The pressure sensor of claim 1, wherein an end wall of the diaphragm separator moves toward the first edge of the piezoelectric resonator in response to an increase in the fluid pressure being exerted on the end wall of the diaphragm separator.

4. The pressure sensor of claim 3, wherein the imparted force depends on a thickness of the end wall of the diaphragm separator.

5. The pressure sensor of claim 3, further comprising a chamber partially bounded by the diaphragm separator, wherein a fluid contained in the chamber exerts the fluid pressure on the end wall of the diaphragm separator, and wherein the fluid is isolated from the piezoelectric resonator.

6. The pressure sensor of claim 5, further comprising a pressure head having a fluid inlet and a channel, wherein the channel extends between the fluid inlet and the chamber.

7. The pressure sensor of claim 5, wherein the fluid is a hydraulic fluid separated from an outside fluid that exerts external pressure that is sensed by the pressure sensor.

8. The pressure sensor of claim 3, wherein the diaphragm separator comprises a protrusion that extends out from the end wall toward the first edge of the piezoelectric resonator and wherein the protrusion is in contact with a section of the flexure structure.

9. The pressure sensor of claim 8, wherein the section of the flexure structure includes the first resonator interface section of the flexure structure.

10. The pressure sensor of claim 8, wherein the section of the flexure structure includes a lower section, an upper section, a front section, a back section, and a middle section that is disposed between the front section and the back section, wherein the front section is proximal to the end wall of the diaphragm separator, wherein the back section is distal from the end wall of the diaphragm separator, and wherein the front section and the back section are coupled to the lower section and to the upper section.

11. The pressure sensor of claim 1, wherein the first resonator interface section of the flexure structure exerts the load on the first edge of the piezoelectric resonator.

12. The pressure sensor of claim 11, wherein the piezoelectric resonator oscillates at a resonant frequency in response to the load being exerted on the first edge of the piezoelectric resonator.

13. A system for measuring a pressure of a fluid, the system comprising:
    a signal source;
    a signal receiver; and
    a pressure sensor comprising:
        a diaphragm separator;
        a flexure structure, wherein the diaphragm separator exerts an imparted force on the flexure structure, wherein the imparted force is proportional to fluid pressure exerted on the flexure structure; and
        a piezoelectric resonator, wherein a first resonator interface section of the flexure structure is in contact with a first edge of the piezoelectric resonator, wherein a second resonator interface section of the flexure structure is in contact with a second edge of the piezoelectric resonator, wherein the first edge and the second edge are opposite edges of the piezoelectric resonator, and wherein the flexure structure exerts a load onto the first edge of the piezoelectric resonator, wherein the load is proportional to the imparted force.

14. The system of claim 13, wherein the signal source is electrically coupled to a first electrode of the piezoelectric resonator and wherein the signal receiver is electrically coupled to a second electrode of the piezoelectric resonator.

15. The system of claim 13, wherein the piezoelectric resonator is a quartz resonator and wherein the signal source is configured to vary a frequency of a signal provided to the piezoelectric resonator.

16. The system of claim 13, wherein the pressure sensor further comprises a chamber partially bounded by the diaphragm separator, wherein fluid pressure is exerted by a fluid contained in the chamber, and wherein the fluid is isolated from the piezoelectric resonator.

17. A method for measuring a pressure of a fluid, the method comprising:
    generating a signal by a signal source;
    receiving the signal by a signal receiver through a pressure sensor;
    processing the signal to determine the pressure sensed by the pressure sensor, the pressure sensor comprising:
        a diaphragm separator;
        a flexure structure, wherein the diaphragm separator exerts an imparted force on the flexure structure, wherein the imparted force is proportional to fluid pressure exerted on the flexure structure; and a piezoelectric resonator, wherein a first resonator interface section of the flexure structure is in contact with a first edge of the piezoelectric resonator, wherein a second resonator interface section of the flexure structure is in contact with a second edge of the piezoelectric resonator, wherein the first edge and the second edge are opposite edges of the piezoelectric resonator, wherein the flexure structure exerts a load onto the first edge of the piezoelectric resonator, wherein the load is proportional to the imparted force, and wherein receiving the signal through the pressure sensor comprises receiving the signal through the resonator.

18. The method of claim 17, wherein the pressure sensor further comprises a chamber partially bounded by the diaphragm separator, wherein fluid pressure is exerted by a fluid contained in the chamber, and wherein the fluid is isolated from the piezoelectric resonator.

19. The method of claim 17, further comprising varying a frequency of the signal by the signal source.

20. The method of claim 19, wherein processing the signal includes determining a voltage level of the signal after the signal is received by the signal receiver.

* * * * *